July 7, 1959   G. C. G. MANSFIELD   2,893,205
HYDRAULIC COUPLINGS

Filed Nov. 14, 1956   2 Sheets-Sheet 1

INVENTOR
GEOFFREY C.G. MANSFIELD

BY
WATSON, COLE, GRINDLE & WATSON
ATTORNEY

July 7, 1959

G. C. G. MANSFIELD 2,893,205

HYDRAULIC COUPLINGS

Filed Nov. 14, 1956

INVENTOR
GEOFFREY C.G. MANSFIELD

BY
WATSON, COLE, GRINDLE & WATSON
ATTORNEY

United States Patent Office 2,893,205
Patented July 7, 1959

2,893,205

HYDRAULIC COUPLINGS

Geoffrey C. G. Mansfield, London, England, assignor to D. Napier & Son Limited, London, England, a company of Great Britain Application November 14, 1956, Serial No. 622,187

Claims priority, application Great Britain December 5, 1955

6 Claims. (Cl. 60—54)

This invention relates to hydraulic couplings of the Föttinger type comprising a vaned driving rotor or impeller and a vaned driven rotor or runner mounted coaxially and in which the hydraulic fluid can be emptied from the chambers in the rotors for disconnecting the drive.

In certain applications, when the coupling has been emptied and the drive is disconnected, there may be substantial relative rotational movement between the two rotors. This may occur, for instance, where the coupling is employed in a gas turbine power plant in the drive for an auxiliary compressor, the impeller being permanently connected to a gas turbine. In such a case the impeller will continue to run at turbine speed when the coupling is emptied, while the runner may be stationary or may rotate considerably more slowly than the impeller. It has been found that in such cases a considerable amount of heat is generated in the coupling owing to air friction and turbulence, which it is desirable to dissipate.

According to the present invention, in a hydraulic coupling of the type specified each rotor consists of two main parts, namely a vaned cup member of semi-toroidal form and a backing member having a semi-toroidal recess therein which receives the vaned cup member, and channels are formed between the adjacent surfaces of the vaned cup members and their backing members providing extended passages leading from an inlet for a supply of cooling liquid to an outlet for this liquid.

The cooling liquid can thus be circulated between the vaned cup member and the backing member of each rotor to provide sufficient cooling. For most purposes it will be sufficient if the cooling liquid is caused to flow only when the coupling is in the disconnected condition, but if desired a continuous flow of cooling liquid can be provided.

Conveniently, the extended cooling passages are in the form of a series of arcuate recesses of different radii, each bounded on the outside by the backing member surface, on the inside by the convex surface of the vaned cup member, and at the edges by segments of circumferential ribs which extend between the cup member and the backing member, each rib being interrupted at intervals and radial barriers being provided between the ribs so that each arcuate recess has an inlet at one end leading from one end of an arcuate recess of smaller radius and an outlet at the other end leading to one end of an arcuate recess of larger radius. With such an arrangement the flow of cooling liquid is in several parallel streams, each stream passing along an arcuate recess of the smallest radius, then through into an arcuate recess of the next larger radius, along this recess, then into an arcuate recess of still larger radius, and so on. Preferably the circumferential ribs project from one of the said members, for instance from the vaned cup member, and fit into corresponding grooves in the other of the said members.

The supply and discharge of the cooling liquid may be effected in any convenient manner, and in one form of the invention the rotors are mounted on hollow concentric shafts which are relatively rotatable, and the inlet for the cooling liquid is in communication with a passage in the hollow interior of one of the shafts. It is convenient also to use the interior of this hollow shaft for the supply of the hydraulic fluid for filling the coupling. With such an arrangement the interior of the hollow shaft may be subdivided by means of sleeves to form a plurality of annular passages, these passages being provided with appropriate through-connections where necessary, leading to the appropriate inlets into the cooling passages and into the rotor chambers respectively.

The hydraulic fluid and the cooling liquid may discharge through apertures around the peripheries of the rotors, these apertures having constrictions for controlling the rate of flow.

The invention may be performed in various ways and one particular form of coupling embodying the invention will now be described by way of example with reference to the accompanying drawings, in which.

Figure 1:
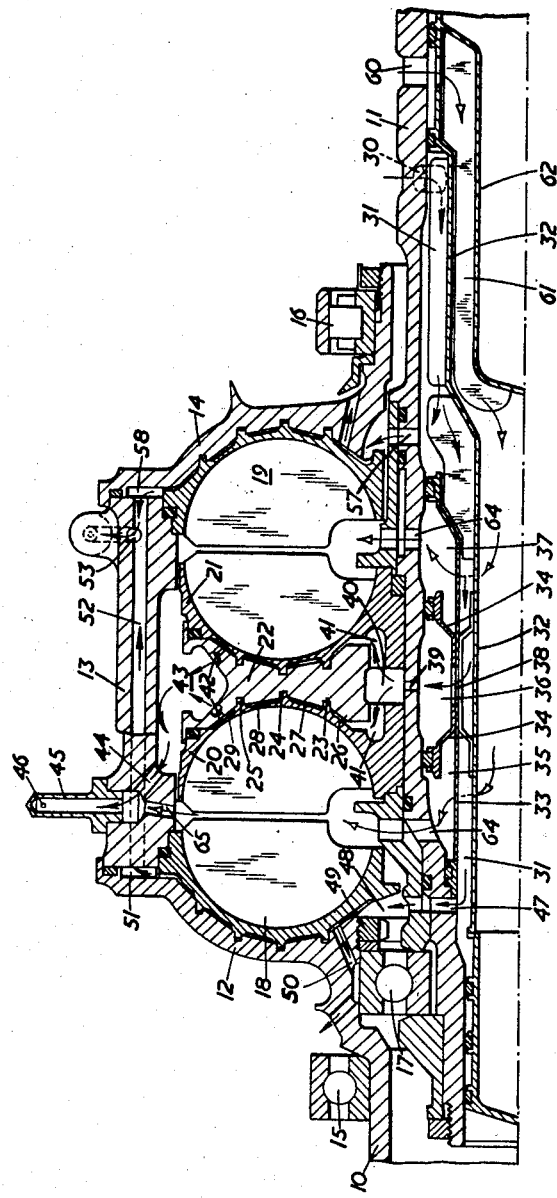
Figure 1 is a sectional elevation of the top half of the coupling.
Figure 2:
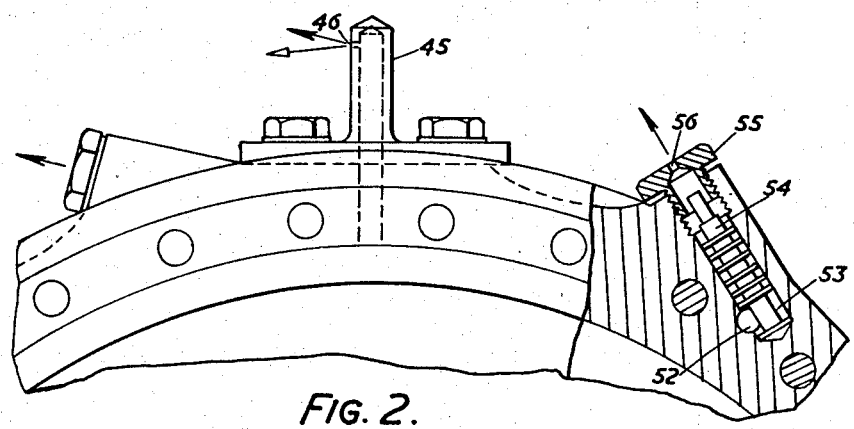
Figure 2 is a fragmentary end view, partly in section, of the coupling.

The coupling shown in the drawings is intended to provide a disengageable connection between a turbine prime mover and an air compressor. The input shaft 10 of the coupling is fixed to the turbine output shaft (not shown) while the output shaft 11 of the coupling is fixed to the compressor shaft (not shown). The input shaft 10 terminates in a concave flange 12 which is rigidly bolted to a drum-like housing 13, the other end of which is rigidly bolted to another concave flange 14. Thus, when the turbine is running, the parts 10, 12, 13 and 14 rotate as one. These parts are mounted in bearings 15 and 16 which are in turn located in a fixed casing which is not shown. The output shaft 11 is supported within the input shaft 10 by means of a bearing 17.

Figure 3:
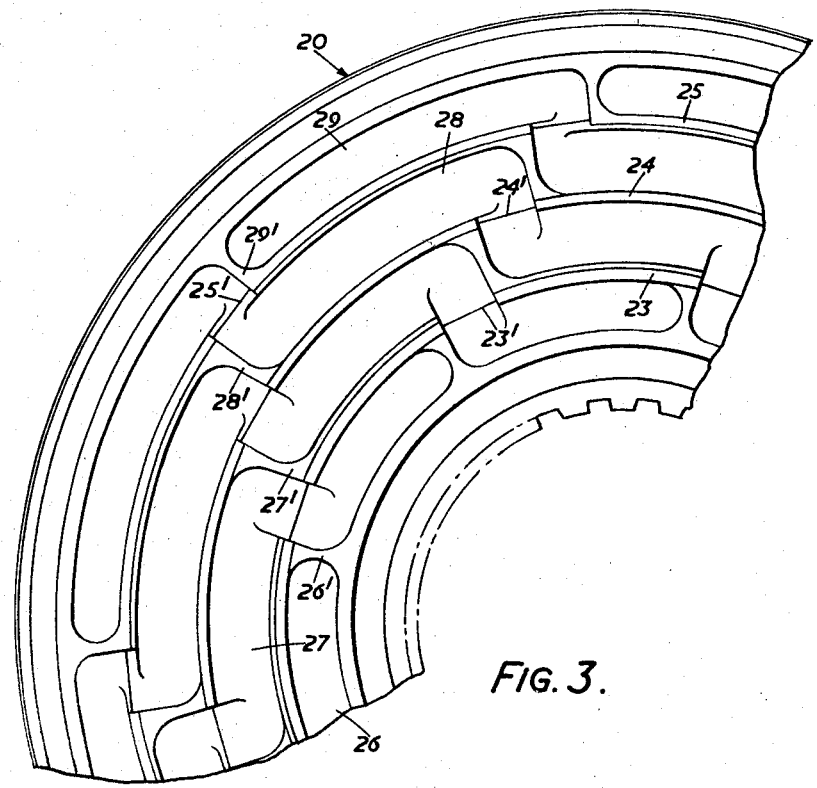
Figure 3 is a fragmentary end view of the convex surface of one of the vaned cup members of the coupling.

The flanges 12 and 14 serve as backing members for vaned driving cup members 18 and 19 respectively. Rigidly mounted on the output shaft 11 are two vaned driven cup members 20 and 21 which are disposed one on each side of a common backing member 22. Channels through which a cooling liquid can flow are provided between the vaned cup members 18, 19, 20 and 21 and their respective backing members 12, 14 and 22. One set of such channels for the rotor comprising the driven cup member 20 and the adjacent part of its backing member 22, will now be described in detail with reference to Figures 1 and 3. The cooling channels for the other rotors are of similar construction.

Formed on the convex surface of the cup member 20 are three circumferential ribs 23, 24 and 25 of progressively increasing radii. Disposed beside these ribs are four sets of shallow arcuate recesses 26, 27, 28 and 29. The recesses of each set are separated from each other by radial barriers 26', 27', 28' and 29'. Moreover, adjacent the end of each arcuate recess the ribs 23, 24 and 25 are interrupted as at 23', 24' and 25' so that one end of each arcuate recess 26 communicates with one end of an arcuate recess 27 of the next larger radius through one of the interruptions 23', the other end of each arcuate recess 27 communicates with one end of an arcuate recess 28 of the next larger radius through one of the interruptions 24', and the other end of each arcuate recess 28 communicates with one end of an arcuate recess 29 of the largest radius through one of the interruptions 25'. There are thus provided several (in this case eight) parallel paths through which cooling liquid can flow from the arcuate recesses 26 of the smallest radius to the arcuate recesses 29 of the largest radius, whereby a substantial proportion of the convex surface of the cup member 20 is exposed to the flow of cooling liquid.

The flow path for the cooling liquid will now be described, the direction of flow of the cooling liquid being indicated in the drawings by black-headed arrows. Cooling liquid is introduced from an external source into an annular space (not shown) surrounding the output shaft 11, whence it can pass through a series of apertures 30 in the wall of the output shaft into a space 31 in the interior thereof, the outer wall of this space being the inner surface of the output shaft 11 and the inner wall of this space being a tubular partition 32 within the hollow interior of the output shaft. The partition 32 is sealed against the output shaft at both ends. Within the central part of the coupling, and between the inner surface of the output shaft 11 and the tubular partition 32 there is provided a second tubular partition 33 of larger radius which is also sealed against the output shaft 11 at both ends and which is provided with flanges 34 extending towards and sealed against the output shaft 11 to provide three compartments 35, 36 and 37. The compartment 36 communicates with the space 31 through an aperture 38 formed in the partition 33. Formed in the wall of the output shaft 11 and communicating with the compartment 36 is an aperture 39 through which the cooling liquid for the two driven rotors can enter an annular chamber 40 bounded at its sides by parts of the cup members 20 and 21 and at its periphery by part of the backing member 22. Leading from the chamber 40 are passages 41 which communicate with the innermost arcuate recesses 26 in the cup members 20 and 21. The cooling liquid can then flow through the other arcuate recesses 27 and 28 into the recesses 29 of the largest radius. The cooling liquid leaves the recesses 29 through restricted orifices 42 formed in the backing member 22 and enters a chamber 43 bounded on the inside by the backing member 22 and by the outer portions of the two cup members 20 and 21, and on the outside by the inner surface of the rotating housing 13. The centrifugal force created by the rotation of the housing 13 holds the cooling liquid against this surface. The cooling liquid escapes from the chamber 43 through passages 44 leading from the said surface, and passes out of the housing through tubular fittings 45 each provided with an outlet orifice 46. The rate at which the cooling liquid escapes through the orifices 46 is determined by the rate of rotation of the housing 13 and the height of the column of cooling liquid trying to escape through the orifices 46.

The flow of cooling liquid for the driving rotor comprising the backing member 12 and the cup member 18 is as follows. The cooling medium passes out of the space 31 through an aperture 47 in the wall of the output shaft 11 into a rotating annular channel 48 bounded by a retainer 49 for the bearing 17 and by part of the cup member 18. The cooling liquid then enters the arcuate recesses of smallest radius between the convex surface of the cup member 18 and the backing member 12. Spill passages 50 lead from these recesses to maintain a constant head of cooling liquid in the cooling recesses for this rotor. Any cooling liquid spilled off through the passages 50 serves to cool the bearing 17 as it escapes from the coupling. The cooling liquid that has passed through the cooling recesses escapes from the recesses of largest radius into an annular channel 51 between the flange 12 and the housing drum 13 and then enters bores 52 running longitudinally through the drum. From each such bore 52 the cooling liquid escapes through a bore 53 into a fitting provided with a labyrinth-type constricting member 54 and a closure plug 55 provided with an outlet orifice 56.

The flow of cooling liquid for the other driving rotor comprising the backing member 14 and the cup member 19 is similar to that just described. In this case the cooling liquid leaves the annular space 31 through an aperture 57 in the wall of the output shaft 11, and enters the bores 52 in the drum through an annular channel 58 in the flange 14.

In most cases the cooling liquid will only be required to circulate when the coupling is empty and there is a large disparity in speed between the driving rotors and the driven rotors, the air friction caused by this disparity in speed and the close proximity of the fast-rotating and slowly-rotating or stationary parts generating heat that has to be removed by the cooling liquid.

When the coupling is to run filled, i.e. when the output shaft 11 is to be coupled to the input shaft 10, the flow of the hydraulic fluid filling medium is as follows. In the drawing the flow of the hydraulic fluid is indicated by white-headed arrows. Hydraulic fluid is admitted to the coupling from an annular chamber (not shown) surrounding the output shaft 11. The fluid enters the output shaft 11 from this chamber through apertures 60 disposed at intervals around the circumference of the shaft and enters a space 61 bounded on the outside by the tubular partition 32 and on the inside in part by a tubular partition 62. The hydraulic fluid leaves the space 61 and enters the two compartments 35 and 37 via passages (not visible in the drawings) which are conducted through the space 31 for the cooling liquid. From the compartments 35 and 37 the hydraulic fluid passes out through apertures 64 in the wall of the output shaft 11 into the interior spaces of the vaned cup members of the driving and driven rotors. Fluid continually leaks off from these interior spaces through apertures 65 in the housing drum 13 which communicate with the fittings 45. The fluid escapes from the fittings 45 through the same orifices 46 that the cooling liquid escapes through when the coupling is running cooled and in the empty condition.

When the coupling is in the filled condition there is a continual flow of hydraulic fluid through it, sufficient hydraulic fluid being introduced to maintain the coupling filled to the desired extent. When the coupling is to be emptied all that is necessary is to cut off the supply of hydraulic fluid, the coupling then rapidly emptying itself as the hydraulic fluid continues to escape therefrom.

The rate of flow of the hydraulic fluid through the orifices 46 is determined by the rate of rotation of the housing 13 and the height of the columns of hydraulic fluid trying to escape through the orifices 46. The distance of the orifices 46 from the axis of rotation, and hence the heights of the columns of hydraulic fluid or cooling liquid, as the case may be, trying to escape through these orifices, is so selected that the same orifices 46 are suitable both for the required discharge rate of hydraulic fluid and of cooling liquid.

Preferably, the same liquid, conveniently engine lubricating oil, is used both as the hydraulic fluid for filling the coupling and as the cooling liquid. This substantially reduces sealing problems, since the escape of some of the cooling liquid into the interiors of the cup members, and the escape of some of the hydraulic fluid into the cooling passages of the rotors, are then no longer objectionable.

What I claim as my invention and desire to secure by Letters Patent is:

1. A hydraulic coupling comprising a vaned driving rotor mounted for rotation about an axis, a vaned driven rotor mounted coaxially with said driving rotor, a filling inlet to said rotors adjacent said axis, means for supplying hydraulic fluid through said filling inlet to said rotors for coupling said driving rotor to said driven rotor, an emptying outlet from said rotors remote from said axis for emptying hydraulic fluid from said rotors to disconnect said drive, each of said rotors consisting of a vaned cup member of semi-toroidal form and a vaned backing member having a semi-toroidal recess therein which receives said vaned cup member, means defining channels between adjacent surfaces of said vaned cup members and said backing members, coolant inlets to said channels adjacent said axis and separate from said filling inlet, means supplying cooling liquid to said channels through said coolant inlets, and coolant outlets from said channels remote from said axis.

2. A hydraulic coupling according to claim 1 in which one member of each pair consisting of a vaned cup member received in a backing member carries a plurality of interrupted circumferential ribs and a plurality of radial ribs extending between said cup member and said backing member and defining a series of arcuate recesses between said cup member and said backing member constituting a plurality of identical extended passages each leading from said cooling liquid inlet to said cooling liquid outlet, each of said recesses being bounded on the outside by a surface of said backing member, on the inside by a surface of said cup member, at the edges by said circumferential ribs and at the ends by said radial ribs, the interruptions of said circumferential ribs being disposed to provide an inlet at one end of each of said recesses leading from one end of a recess of smaller radius and an outlet at the other end thereof leading to one end of a recess of larger radius.

3. A hydraulic coupling according to claim 2 in which said circumferential ribs of one member of said pair fit into corresponding circumferential grooves formed in the other member of said pair.

4. A hydraulic coupling according to claim 1 which includes a hollow shaft for said driving rotor, a hollow shaft for said driven rotor concentric with said first-mentioned shaft, bearing means supporting said shafts for relative rotation, means defining separate fluid supply passages in the hollow interior of one of said shafts, said filling inlet communicating with one of said fluid supply passages, and said coolant inlet communicating with another of said fluid supply passages.

5. A hydraulic coupling according to claim 4 in which the hollow interior of the shaft containing said fluid supply passages includes sleeves sub-dividing said interior to form a plurality of annular fluid supply passages, means providing a through-connection through an outer one of said annular passages leading from an inner one of said annular passages to the exterior of said shaft in communication with one of said inlets, and a connection from said outer annular passage to the exterior of said shaft in communication with another of said inlets.

6. A hydraulic coupling according to claim 1 in which discharge members having discharge orifices are provided around the peripheries of said rotors and said orifices are provided with constrictions which communicate with said emptying and said coolant outlets to control the rate of outflow of liquid therethrough.

References Cited in the file of this patent

UNITED STATES PATENTS

| | | |
|---|---|---|
| 1,327,080 | Brown | Jan. 6, 1920 |
| 1,657,192 | Belluzzo | Jan. 24, 1928 |
| 1,868,146 | Kiep | July 19, 1932 |
| 2,297,196 | Berger | Sept. 29, 1942 |
| 2,699,642 | Ahlen | Jan. 18, 1955 |